(No Model.) 3 Sheets—Sheet 2.
C. A. A. RAND.
HARVESTER REEL SUPPORT.
No. 481,191. Patented Aug. 23, 1892.
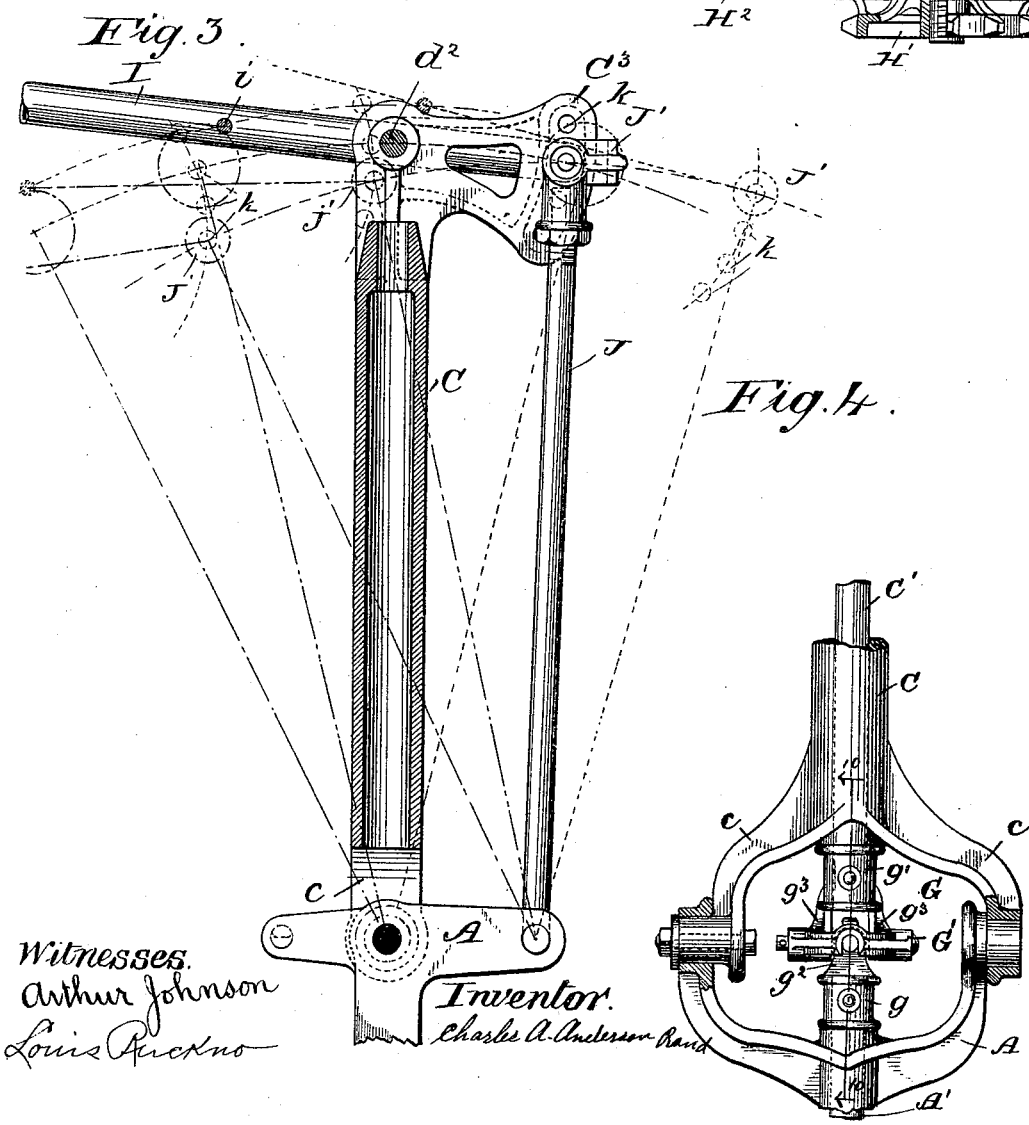
Witnesses.
Arthur Johnson
Louis Ruckno
Inventor.
Charles A. Anderson Rand (No Model.) 3 Sheets—Sheet 3.
C. A. A. RAND.
HARVESTER REEL SUPPORT.

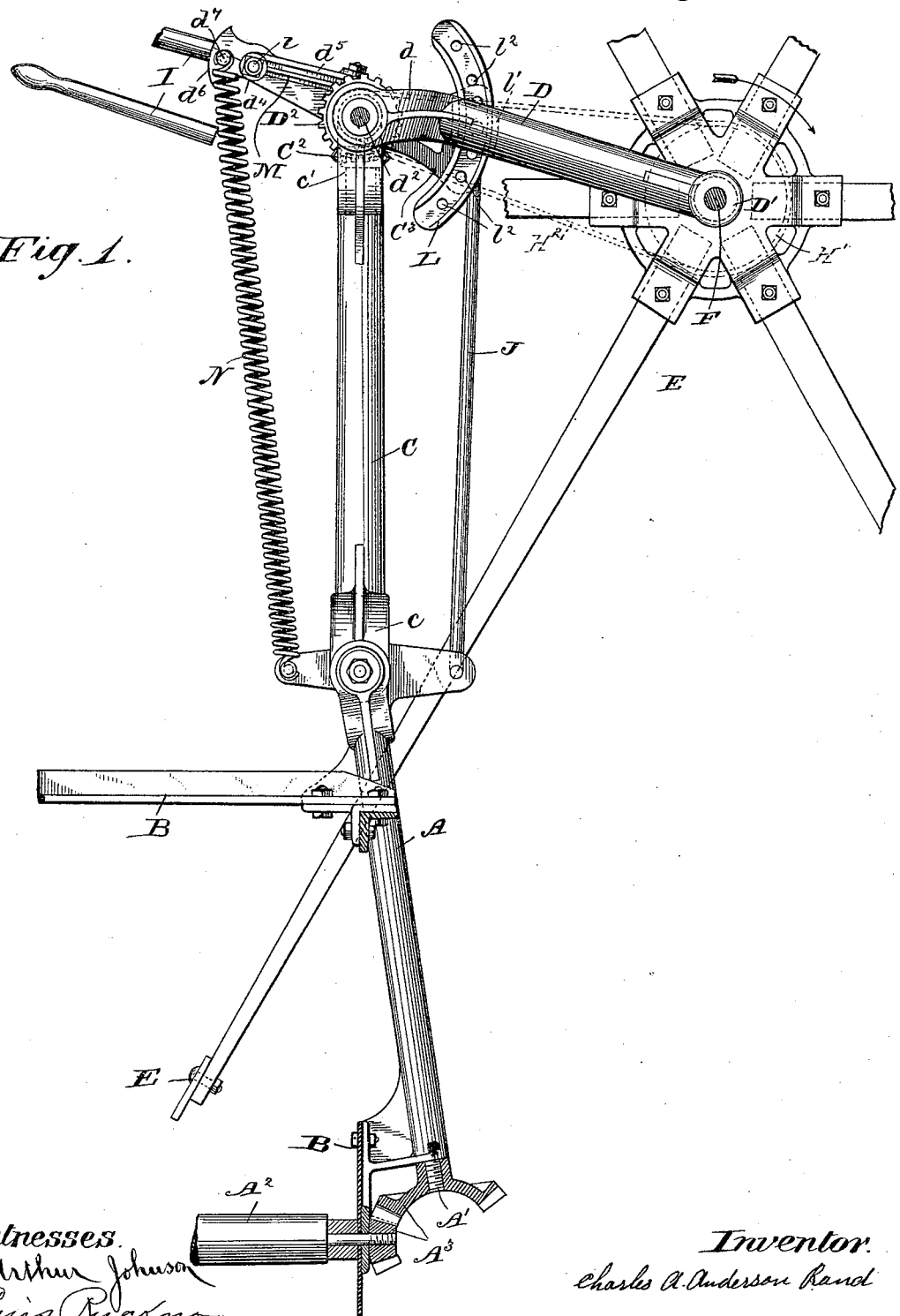

No. 481,191. Patented Aug. 23, 1892.

Witnesses
Arthur Johnson
Louis Brekno

Inventor
Charles A. Anderson Rand

UNITED STATES PATENT OFFICE.

CHARLES A. ANDERSON RAND, OF CHICAGO, ILLINOIS, ASSIGNOR TO THE WILLIAM DEERING & COMPANY, OF SAME PLACE.

HARVESTER-REEL SUPPORT.

SPECIFICATION forming part of Letters Patent No. 481,191, dated August 23, 1892.

Application filed March 14, 1892. Serial No. 424,762. (No model.)

*To all whom it may concern:*

Be it known that I, CHARLES A. ANDERSON RAND, of Chicago, in the county of Cook and State of Illinois, have invented certain new and useful Improvements in Harvester-Reel Supports, of which the following is a full description, reference being had to the accompanying drawings.

My invention relates to that class of reels in which adjustment is made in two directions—viz., fore and aft and up and down—and has for its object ease and simplicity of adjustment, as hereinafter pointed out.

Figure 5:
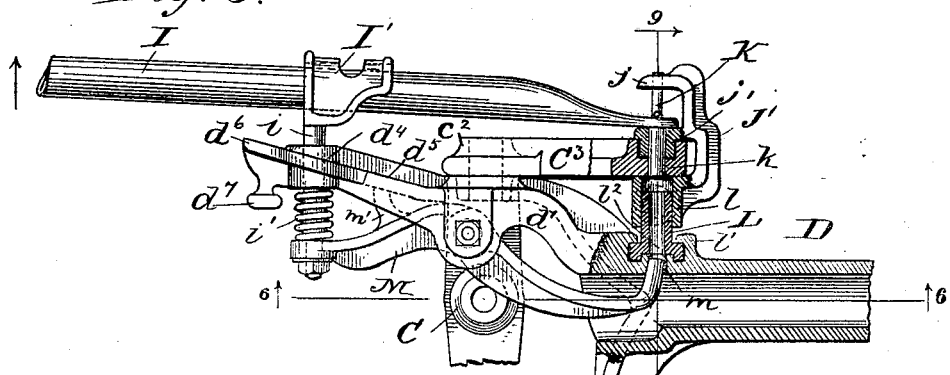
Figure 7:
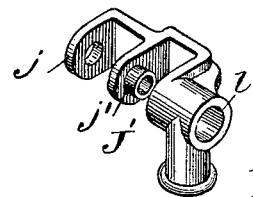
Figures 6, 8:
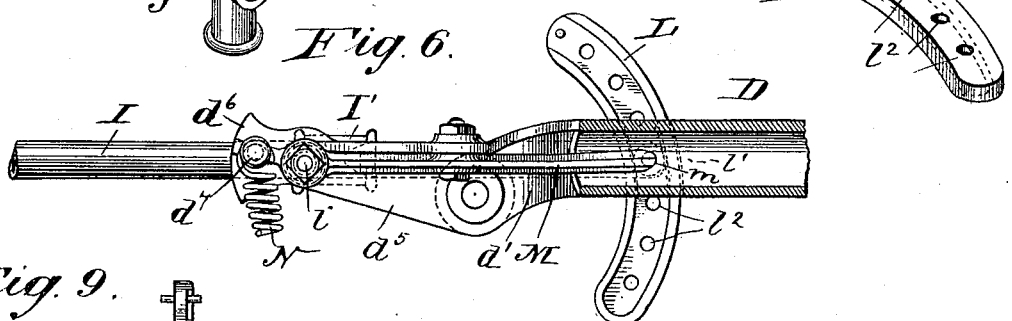
Figures 9, 10:
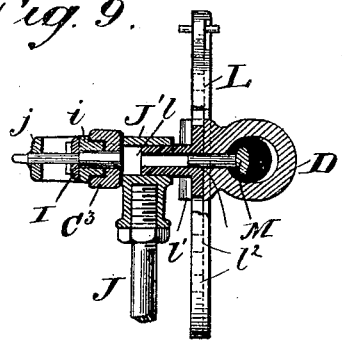

In the drawings, Figure 1 is a side elevation of my device, showing enough of a harvester-frame to illustrate the invention. Fig. 2 is a plan view with certain parts broken away and certain other parts shown in the position to accomplish fore-and-aft adjustment of the reel. Fig. 3 is a view of certain parts and a diagram showing other parts by which the fore-and-aft adjustment is made. Fig. 4 is a front elevation of the lower joint of the reel-standard and universal joint connecting the driving-shafts. Fig. 5 is a plan view similar to Fig. 2, showing certain of the same parts in the position to effect a vertical adjustment of the reel. Fig. 6 is a vertical section on the line 6 6 of Fig. 5. Fig. 7 is a perspective view of the upper end of the radius-bar. Fig. 8 is a perspective view of the quadrant depended upon to control vertical adjustments. Fig. 9 is a vertical section on the line 9 9 of Fig. 5. Fig. 10 is a vertical section on the line 10 10 of Fig. 4.

A is the base-support, suitably secured to or forming part of the frame B of a harvester and affords bearing for the shaft A'. It is bifurcated at its upper end in order to provide supports for the reel-standard C. The latter is preferably made hollow in order to provide bearing for the shaft C', and has at its lower end arms $c$ $c$, so constructed as to make a joint with the bifurcated end of the base-support, upon which the reel-standard rocks. At the upper end of the standard arms $c'$ and $c^2$ are provided, to which is pivoted the reel-bracket D, having arms $d$ and $d'$, so constructed as to make a pivotal joint with the said arms $c'$ and $c^2$ of the standard. The reel-spider E is secured to the shaft F in the usual manner, the said shaft having bearing in the sleeve D' of the bracket D.

Rotation may be imparted to the reel in the direction shown by the arrow from the elevator-drum $A^2$ through the instrumentality of the bevel-gears $A^3$, the shaft A', the universal joint G, (hereinafter more particularly described,) the shaft C', the bevel-gears $C^2$ and $D^2$, (the latter secured to a shaft $d^2$, having bearings in the joints formed by the arms $c'$ and $c^2$ and $d$ and $d'$,) and over the sprocket-wheels H and H' is thrown the chain $H^2$.

The universal joint G consists of three parts, two of which $g$ and $g'$ are secured to the shafts A' and C', respectively. These parts have ears $g^2$ $g^2$ and $g^3$ $g^3$, which are pivotally secured to the third part of the joint G', which is a ring, so as to form the two axes of said joint. The ring G' is secured to one of the parts—as, for instance, $g'$—by means of a bolt or pin passing through said ring and the ears $g^3 g^3$, which forms one axis. The other axis is formed by the ears $g^2$, pivoted in recesses in the ring, cut somewhat deep and so made that when it is desired to remove the reel-standard from the base-support the parts $g'$ and G' may be carried with it on the shaft C', leaving the part $g$ on the shaft A' without setting free any other parts.

I is the hand-lever, and I' is a sleeve surrounding the same, the said sleeve having a stud $i$, which may be integral therewith and which is supported in a boss $d^4$ of the extension-arm $d^5$ of the arm $d'$. The said stud extends far enough through the boss $d^4$ to take a spring $i'$, the purpose of which will soon be made clear.

$C^3$ is a quadrant, preferably made integral with the arm $c^2$ of the reel-standard.

J is a radius-bar pivoted at its lower end to any fixed portion of the harvester—as, for instance, the base-support—at a point a convenient distance in front of the lower joint of the reel-standard and terminating in a piece J', (shown in Fig. 7,) which carries a part of each locking device. The said piece has two lugs $j$ and $j'$, the latter having a boss formed thereon which is adapted to slide in the quadrant $C^3$. The lugs $j$ and $j'$ carry the latch K, which engages any of the series of holes $k$ in the quadrant $C^3$, thereby holding the reel-standard in any desired fore-and-aft position. The latch-piece K takes the end of the lever I, and may be secured thereto at a point between the lugs $j$ and $j'$ by means of a shoulder and pin or by any well-known means. The rearward extension-arm $d^5$ terminates a short distance rearward of the boss $d^4$, and there affords a fulcrum $d^6$ for the lever. When it is desired to disengage the latch K from the quadrant $C^3$, stress is applied in the direction indicated by an arrow in Fig. 2, and it will be seen that when the said latch is disengaged the spring $i$ will be compressed, thus obtaining the necessary prompt return to place of said latch when the stress is removed from the lever.

By referring to Fig. 3 it will be seen that the pivotal centers of the standard C and radius-bar J being some distance apart the latch-piece K will be carried by the upper end of said bar opposite each of the holes $k$ in the quadrant $C^3$ as the standard is moved fore and aft, and that said movement is limited by the boss $j'$ coming in contact with the ends of the slot in said quadrant.

L is a quadrant shown in Figs. 1, 6, and 8 and held in a socket $l$ on the piece J'. Guideways $l'$ are formed on the bracket D, which hold the said quadrant in place. This quadrant has a series of holes $l^2$, with which the latch M engages through the aperture $m$ in the bracket D. The said latch is pivoted to the arm $d'$ and extends rearward to the stud $i$, and may be held thereon by any well-known means, preferably, as shown, by a nut and washer. A projection $m'$ on the latch M acts as a stop against the extension $d^5$ to limit the movement of said latch. When it is desired to disengage the latch M from the quadrant L, stress is applied to the lever I in the direction indicated by the arrow in Fig. 5, the lug $j'$ being the fulcrum. It will be seen that the spring $i'$ acts to keep both latches in engagement with their respective quadrants. A coiled spring N is secured at $d^7$ to the extension-arm $d^5$ of the bracket D at its upper end and to the base support A at its lower end and acts to counterbalance the weight of the reel carried on the forward end of the bracket D. It will be seen that the upper end of the radius-bar could be adapted to carry either both latches or both quadrants without departing from the principles of my invention as demonstrated in the drawings.

What I claim as my invention, and desire to secure by Letters Patent, is—

1. The combination, with the reel-standard carrying a quadrant, of a reel-supporting bracket pivoted to said standard at its upper end, a hand-lever, a latch controlled by said lever, and a radius-bar pivoted a convenient distance from the lower end of said standard and terminating at its upper end in a piece which carries said latch and slides in said quadrant, substantially as and for the purpose described.

2. The combination, with the reel-standard carrying a quadrant, of a reel-supporting bracket pivoted to said standard, a hand-lever supported in said bracket, a latch controlled by said lever and adapted to engage said quadrant, and a radius-rod having its upper end adapted to carry said latch and to slide in said quadrant, substantially as and for the purpose described.

3. The combination, with a reel-standard and bracket, of the quadrants $C^3$ and L, the latches K and M, a hand-lever controlling said bracket and latches, and a radius-bar having its upper end adapted to sustain both latching devices, substantially as and for the purpose described.

4. The combination, with the reel-standard having the quadrant $C^3$ and the reel-bracket carrying the latch M jointed together, of the radius-bar J, carrying a bracket adapted to support and guide the latch-pin $k$, that by engaging the quadrant on the reel-standard controls the fore-and-aft adjustment of the said standard, and to sustain a second quadrant that engaged by the latch M controls the position of vertical adjustment of the reel-bracket, and suitable means for controlling the said latches, all combined substantially as described.

5. The combination of the reel-standard having the quadrant $C^3$ and the reel-bracket jointed thereto and having the latch M with the radius-bar J, having the bracket J', adapted to sustain and guide the latch that engages the quadrant $C^3$ and to sustain the quadrant L that is engaged by the latch M, and a lever pivoted to said bracket J' in such a manner as to slide the latch that engages the said quadrant $C^3$ and supported in the slide-bolt that controls the latch M, whereby the movement of the lever sidewise in one direction releases the latch from the quadrant $C^3$ and in the other direction releases the latch M, substantially as described.

6. The combination, with a reel-standard carrying the quadrant $C^3$, of a reel-bracket, a radius-bar carrying the latch K, that engages said quadrant and the quadrant L, the latch M, that engages the said quadrant L, and the hand-lever I, substantially as and for the purpose described.

7. The combination, with a reel-standard carrying a quadrant and a reel-bracket, of the radius-bar J, carrying the piece J', the latches K and M, the quadrant L, and the lever I, substantially as and for the purpose described.

8. The combination, with a reel-standard carrying a quadrant and a reel-bracket, of a radius-bar J, carrying the piece J', the latches K and M, the quadrant L, the lever I, and the spring-controlled sleeve I', substantially as and for the purpose described.

CHARLES A. ANDERSON RAND.

Witnesses:
ARTHUR JOHNSON,
ELISE M. HALVERSON.